United States Patent Office

3,219,457
Patented Nov. 23, 1965

3,219,457
METHOD OF IMPROVING THE WHIPPING
CHARACTERISTICS OF EGG WHITES
Homer F. Ziegler, Jr., Glendale, and Henry J. Buehler, St. Louis, Mo., assignors to Anheuser-Busch, Incorporated, St. Louis, Mo., a corporation of Missouri
No Drawing. Filed May 10, 1961, Ser. No. 108,992
13 Claims. (Cl. 99—113)

The present invention relates to a new and improved egg white product and to a novel additive therefor and to processes of making said egg white product and said additive. The invention further relates to a method of improving the whipping characteristics of egg whites, particularly dried egg whites.

Various chemical additives are presently added to egg whites to improve the whipping characteristics thereof. Among these additives are various edible surface active agents such as sodium lauryl sulfate, triacetin, sodium desoxycholrate, triethyl citrate and others. The present invention relates to an entirely different type of egg white additive which can be added alone or in combination with one or more of those presently used to materially shorten the whipping time of the egg whites.

In particular, in the present invention, small quantities of okra gum, alone or in combination with a second whip time decreasing agent, particularly triethyl citrate, are added to egg white solids to materially shorten the whipping time of the egg whites. In addition to shortening the whip time, the novel additives of the present invention favorably affect other characteristics such as increasing the volume and providing better texture of angel cakes made from the dried reconstituted egg whites.

Okra gum by itself materially shortens the time necessary to whip dried reconstituted egg whites to a meringue of the desired density. Also, when okra gum and a second whip time reducing additive are both added to the egg whites, the whipping time is further substantially and unexpectedly reduced.

The okra gum apparently exerts a synergistic effect when combined with other additives to substantially decrease the whipping time over the decrease caused by either ingredient added alone.

For example, 0.04% okra gum by weight of the liquid egg white decreases the whip time of the egg white by 40% and 0.03% triethyl citrate decreases the whip time 55% when used alone. However, when 0.04% okra gum and 0.03% triethyl citrate are used in combination, the whip time of the egg white is reduced by 70%. Similar results occur when okra gum is combined with other surface active egg white whip time reducing agents.

In addition, when a concentrate of okra gum is prepared from an aqueous extract of fresh okra or fresh frozen okra, and this okra gum concentrate is added to egg whites, the whip time of the egg whites is further reduced compared to the whip time reduction caused by the addition of conventional commercial dry okra gum derived from okra pods.

The fresh okra gum concentrate can be used in substantially smaller concentrations than the conventional dried okra gum either when used alone or in combination with other whip time reducing agents.

Mixtures of fresh okra gum concentrate and dried okra gum also can be used to reduce the whip time of egg whites.

It is an object of the present invention to provide a new and improved egg white product, particularly a dried egg white composition, having incorporated therein a small quantity of okra gum, said product having improved whipping and baking characteristics.

Another object of the present invention is to provide an improved and new egg white composition having incorporated therein okra gum and a second whip time reducing egg white additive having surface active properties, preferably triethyl citrate, said additives being present in small but effective amounts to improve the whipping and baking characteristics of the egg whites in combination more than either additive alone.

It is a further object to provide a new and improved process of producing egg white products which exhibit improved whipping and baking properties.

Still another object is to provide a method of improving the whipping properties of egg whites, particularly dried egg whites, by incorporating into said egg whites a predetermined small quantity of okra gum alone or in combination with small but effective amounts of triethyl citrate.

It is a further object of the present invention to provide a novel okra gum concentrate from fresh or fresh frozen okra and a method of making same, said okra gum when added to egg whites, having the unexpected characteristic of reducing the whip time of the egg whites to a greater extent than the whip time reduction effected by conventional dry okra gum.

These and other objects and advantages will become apparent hereinafter.

The present invention comprises an egg white composition including okra gum, alone or in combination with a second additive, preferably triethyl citrate, said egg white composition having a shortened whipping time and better baking charactristics than untreated egg whites. In addition, the present invention comprises a novel okra gum concentrate and a method of making same from fresh or fresh frozen okra. The present invention further consists in the process of making said egg white product and in the process of improving the whip characteristics of egg whites, particularly dried egg whites by the addition of okra gum thereto.

EGG WHITE WHIP TEST

In the present application, when the whip time of egg whites is referred to, the whip time is determined in the following manner:

Using the following standard formula, all of the ingredients except the water are dry blended together before the water is added at 65° F.

| | Gms. |
|---|---|
| Granulated sugar | 132. |
| Egg white (based on dry solids) | 41.3 |
| Salt (NaCl) | 2.7 |
| Acid salt (monobasic calcium phosphate) | 0.83 |
| Water | 290. |

If frozen egg whites are used, the amount of water in the foregoing formula is omitted to correct for the water in the frozen egg whites.

The mixture is reconstituted in a Hobart 5-quart mixer (Model N–50) at low speed for 3 minutes, scraping the bowl after each minute. The egg white mixture is then whipped in the mixer on second speed to a meringue specific gravity of 0.165–0.175 grams per milliliter (g./ml.). The whip time is the period after reconstitution until the egg white mixture reaches a meringue specific gravity of 0.165–0.175 g./ml. The okra gum and other additives are added to the ingredients in the formula before mixing with the water.

The okra gum used in the present invention is either a dry product of the vegetable gum derived from okra pods or a concentration of okra gum prepared from an aqueous extract of fresh or fresh frozen okra. The dry okra gum is a commercial preparation having the following analysis:

| | Percent |
|---|---|
| Carbon | 40.4 |
| Hydrogen | 6.1 |
| Nitrogen | 2.1 |
| Ash | 6.6 |

The concentrate of fresh oka is prepared in the following manner:

Twenty ounces of ground fresh okra are extracted with 6 liters or room-temperature water by slow stirring for four hours. The mass is poured through a 40-mesh sieve and the filtrate contains 0.5 gram of solids per 100 milliliters. The solids contain 2.4% nitrogen.

When twenty-five milliliters of this Extract No. I are added to the ingredients in the egg white whip test, the resulting egg white product has a whip time of 9 minutes, compared with a 12 minute whip time for egg whites without the additive Extract No. I. Greater or smaller amounts of Extract No. I increase the egg white whip time over 9 minutes.

500 milliliters of the water extract of okra prepared as hereinbefore described (Extract No. I) are mixed with 1000 milliliters of methyl alcohol to produce a gummy precipitate, which adheres to the walls of the beaker and to the stirrer. The supernatant fluid is discarded and the precipitated gum is treated with 500 milliliters of water and allowed to stand 24 hours with intermittent stirring to dissolve the precipitate. This solution, Extract No. II, contains 0.2 gram of solids per 100 milliliters. Fifteen milliliters of this solution added to egg whites reduce the whip time thereof from 12 minutes to 4½ minutes.

In addition to methyl alcohol, all other water miscible solvents such as ethanol, other alcohols, acetones, etc., give similar results in producing concentrates of okra gum having the increased activity of Extract No. II.

Using the same procedure as described for Extract No. II, except that 1000 ml. of ethanol is substituted for the methyl alcohol, a final okra gum concentrate is produced in the same amounts and having the same whip time decreasing properties as Extract No. II.

Using the same procedure described for Extract No. II, except that 500 ml. of acetone is substituted for the methyl alcohol, a final okra gum concentrate is produced in the same amounts and having the same whip time decreasing properties as Extract No. II.

The following table, Table No. I, shows the reductions of egg white whip time of the additives, Extract No. I and Extract No. II (prepared from three different water miscible solvents), compared with a conventional whip time reducing agent, triethylcitrate, based on a solids basis.

TABLE NO. I

| | Mg. of Additive Solids | Whip Time (Minutes) |
|---|---|---|
| Control (no additives) | | 12 |
| Okra gum concentrate-Extract No. II (Methyl alcohol) | 30 | 4½ |
| Okra gum concentrate-Extract No. II (Methyl alcohol) | 10 | 6 |
| Okra gum-water extract-Extract No. I | 125 | 9 |
| Triethyl citrate | 100 | 6 |
| Okra gum concentrate-Extract No. II (Ethanol) | 30 | 4½ |
| Okra gum concentrate-Extract No. II (Acetone) | 30 | 4½ |

It appears that in the preparation of the okra gum concentrate, Extract No. II, inhibitors are removed from the active agent, thus causing lower whip times with increasing levels of purified active agent.

The exact composition of the okra gum is not known. It may contain the polysaccharide composed of D-galactose, D-galacturonic acid, and L-rhamnose which was reported by Whistler and Conrad (Journal of American Chemical Society, Vol. 76, pp. 1673–1674, March 20, 1959), although water extracts of okra and concentrates prepared from water extracts of okra may cantain other substances than this polysaccharide, some of which appear to inhibit foam formation.

By careful processing, it is possible to achieve reductions in egg white whip time with commercial dehydrated okra gum which are comparable to the foregoing results achieved with concentrated okra gum (Extract No. II). However, the levels of reagent still are higher, and the processing steps are complex when the commercial dried okra gum is so treated. For example, 0.04% of a commercial dehydrated okra gum (based on the weight of reconstituted egg whites) and the other whip time test ingredients are reconstituted in water, and any foam that develops during the reconstitution period is removed. The mixture is allowed to stand 20 hours at 40° F. before performing the whip test. The whip time of the egg whites to which dried okra gum is added and the foam is removed after reconstitution and the product is allowed to stand 20 hours before testing, is only 4½ minutes, which compares to the whip time of egg whites treated with Extract No. II. When the foam is added back to the egg white and okra gum mixture after 20 hours, the whip time is 9 minutes, which compares to the whip time of egg whites treated with Extract No. I.

The foregoing data demonstrate further that the method and time for rehydrating the okra gum with egg whites also affects the effectiveness of okra gum in decreasing whip time of egg whites.

The incorporation of dry okra gum with egg whites before rehydration is more effective in reducing whip time than if okra gum is dispersed in water and then added to the egg white mixture. Also, the shearing action of mechanical agitation, such as a Waring blender, will decrease the effectiveness of okra gum suspensions.

The dried okra gum is effective in amounts as small as 0.01% by weight based on the weight of reconstituted egg white (albumen and water), which corresponds to about 0.08% okra gum by weight based on the weight of albumen solids. An amount of dried okra gum greater than 0.06% by weight based on the weight of reconstituted egg white is effective, but does not result in further decreases in whip time. The preferred amount of dried okra gum used alone is about 0.04% by weight based on the weight of reconstituted egg white. As mentioned, more okra gum can be used, but it does not further decrease the whip time of the eggs.

When the concentrate of okra gum (Extract No. II) is used instead of dried okra gum, the minimum amount of reagent is about 0.002% by weight based on the weight of reconstituted egg white and the preferred amount is about 0.006% by weight. Greater amounts of okra gum concentrate can be used, but do not cause further decreases in whip time of the egg whites.

When the dried okra gum is combined with a second whip time reducing additive such as triethyl citrate or triacetin, from about 0.01% to about 0.06% okra gum is combined with from about 0.01% to about 0.06% of the second additive, the percentages being by weight based on the weight of reconstituted egg white. Again, greater amounts of both reagents can be used, but no further decreases in whip time result. The preferred composition contains about 0.04% dried okra gum and about 0.03% triethyl citrate.

The okra gum preferably is dry blended with the dried egg whites, prior to their being reconstituted in water. However, if the okra gum is dispersed or dissolved in a suitable solvent, it can be added to the egg whites before drying or to the reconstituted egg whites prior to whipping. The second additive can be added prior to drying, dry blended with the finished product, or added to the reconstituted egg albumen.

In the following tables, the okra gum referred to is the dry preparation which is commercially available. Comparable results are obtained with the concentrate of okra gum (Extract No. II), but with correspondingly lower amounts of reagent on a solids basis, as hereinbefore explained.

The following table, Table II, shows the effectiveness of okra gum by itself in reducing the whip time of reconstituted egg white solids used in the preparation of meringues.

Although the whip time of the untreated egg whites varies in the tables between 10 and 12 minutes, a variation of whip times of 1–2 minutes between different lots of egg whites is common. Each of the tables use only one lot of egg whites so that the present reductions in whip times reported are accurate.

TABLE II

| Example | Dried Okra Gum* | Whip Time (Minutes) |
|---|---|---|
| Control | 0 | 10 |
| No. 1 | 0.01% | 8 |
| No. 2 | 0.02% | 6½ |
| No. 3 | 0.03% | 6 |
| No. 4 | 0.04% | 5 |
| No. 5 | 0.05% | 5 |
| No. 6 | 0.06% | 6 |

*By weight of reconstituted egg whites (albumen + water).

From the foregoing table, it is apparent that 0.01% of okra gum alone reduces the whip time by 20% and that the most effective level of okra gum alone is about 0.04 to 0.05% which reduces the whip time by 50%.

The following table, Table III, shows the improved functional properties of egg white solids containing okra gum as determined by angel cake bake tests.

TABLE III

| Example* | Whip Time | Specific Gravity (g./ml.) | | Volume (cm.) | Texture |
|---|---|---|---|---|---|
| | | Meringue Stage | Batter | | |
| Control | 10 | .172 | .277 | 10.1 | G– |
| No. 1 (0.03%) | 6 | .168 | .285 | 10.5 | G |
| No. 2 (0.03%) | 6 | .170 | .277 | 10.4 | G |
| No. 3 (0.15%) | 7 | .177 | .293 | 9.8 | G |

*Percent dried okra gum by weight of reconstituted egg whites.

From the foregoing, it is apparent that an amount of okra gum of 0.03% decreases the whip time by 40% and gives angel cakes a larger volume than those made with the control egg whites which use no okra gum. Furthermore, the angel cakes using the okra gum additive have an improved texture (G) as compared to the cakes made from the control egg whites (G–). When as much as 0.15% okra gum is added to the egg whites, a 30% reduction in whip time is affected as compared to the control egg whites and the texture of the cake is improved. However, there is no further increase in cake volume. The angel cakes using the present improved egg whites can be made according to either the foam method or the meringue method, and satisfactory angel cakes result.

The following tables, Table IV and Table V show the results obtained when okra gum and other additives are combined with dried egg whites. The evaluation procedure in Table IV is the same as that employed in Table I, except that sodium chloride and a phosphate acid salt are incorporated in the meringue in the same proportions as used in the first stage of mixing angel cake mixes. The meringue pH is 6.2. The whip time is the time in second speed required to beat the egg whites to a density of 0.167 grams per milliliter.

TABLE IV

*Effects of triethyl citrate upon whip time of reconstituted dried whites*

| | Whip Time (Minutes) | Percent Reduction in Whip Time |
|---|---|---|
| 1. Control | 12 | |
| 2. Triethyl citrate 0.01% | 8½ | 29.2 |
| 3. Triethyl citrate 0.03% | 6 | 50.0 |
| 4. Triethyl citrate 0.05% | 6½ | 45.8 |

*Combined effect of dried okra gum and triethyl citrate*

| | Dried Okra Gum | Triethyl Citrate | Whip Time | Percent Reduction |
|---|---|---|---|---|
| 1 | 0.02 | 0.03 | 5 | 58.3 |
| 2 | 0.03 | 0.03 | 4½ | 62.5 |
| 3 | 0.04 | 0.01 | 5 | 58.3 |
| 4 | 0.05 | 0.03 | 4 | 66.7 |

TABLE V

| | Dried Okra Gum* | Percent Reduction in Whip Time (Control—12 min. Whip Time) |
|---|---|---|
| Triacetin:* | | |
| 0.01 | | 16.6 |
| 0.03 | | 25.0 |
| 0.07 | | 33.3 |
| 0.01 | 0.04 | 53.3 |
| 0.03 | 0.04 | 62.5 |
| 0.07 | 0.04 | 62.5 |
| Sodium Desoxycholate:* | | |
| 0.03 | | 20.8 |
| 0.05 | | 37.5 |
| 0.10 | | 62.5 |
| 0.03 | 0.04 | 45.8 |
| 0.05 | 0.04 | 54.2 |
| 0.10 | 0.04 | 87.3 |

*By weight of reconstituted egg whites.

From the foregoing Tables IV and V it is apparent that when both okra gum and a second whip time reducing additive, particularly a surface active additive having whip time reducing properties, are combined with dried egg whites, the reduction in whip time of the reconstituted egg whites is materially greater than the reduction in whip time effected by either additive when used by itself. Since all of the additives have a point of maximum effectiveness after which increased amounts do not further decrease the whipping time and sometimes even increase it, the unexpected results of this invention are not merely the effect of more additive being present. Thus the okra gum when combined with other additives has the unexpected synergistic effect of further decreasing the heretofore maximum decrease in whip time of egg whites caused by each of the additives.

Also, although sodium lauryl sulfate is not as effective a whip time reducing agent as triethyl citrate, when okra gum is added in addition to the sodium lauryl sulfate, the whip time of egg whites is materially reduced.

Table VI shows additional angel cake bake tests using okra gum and triethyl citrate, sodium desoxycholate and triacetin. The data demonstrate the effectiveness of combinations of okra gum and other whip time reducing agents. Okra gum and sodium desoxycholate is most effective in reducing whip time, but produces cake of poorer texture. The best overall results were obtained with a mixture of okra gum and triethyl citrate.

TABLE VI

*Angel cake bake tests*

| | Whip Time | Specific Gravity | | Percent Reduction in Whip Time | Vol. (cm.) | Texture |
|---|---|---|---|---|---|---|
| | | Meringue | Batter | | | |
| 1. Control, none | 12 | .172 | .280 | | 9.4 | G— |
| 2. Triethyl Citrate, 0.03% | 6 | .173 | .280 | 50.0 | 9.2 | G— |
| 3. Okra Gum, 0.04% | 7 | .173 | .282 | 41.7 | 9.3 | G— |
| 4. Sodium Desoxycholate, 0.10% | 5 | .162 | .262 | 58.3 | 7.0 | P |
| 5. Triacetin, .075% | 8 | .172 | .283 | 33.3 | 9.0 | G |
| 6. Okra, 0.04%; Triethyl Citrate, 0.03% | 3 | .173 | .282 | 75.0 | 9.3 | G |
| 7. Okra, 0.04%; Sodium Desoxycholate, 0.10% | 2 | .168 | .277 | 83.2 | 7.5 | P— |
| 8. Okra, 0.04%; Triacetin, 0.03% | 4½ | .175 | .285 | 62.5 | 9.5 | G |

Table VII shows the effects on egg white whip time produced by the addition of okra gum concentrate (Extract No. II) alone and in combination with a second surface active whip time reducing agent, preferably triethyl citrate. Table VII also shows the meringue specific gravity resulting after the whip time reducing agents are added to the egg whites. Between an 85-90% reduction in whip time is accomplished by the addition of various combinations of okra gum concentrate and triethyl citrate compared to the 45-50% reduction of either additive used alone.

The concentrated okra gum (Extract No. II) produces similar results when combined with any of the other surface active whip time reducing agents hereinbefore discussed.

TABLE VII

*Effects of okra gum concentrate and triethyl citrate upon the whip time of reconstituted dried whites*

| | Okra Gum Concentrate* Extract No. II, Percent | Triethyl Citrate, Percent | Whip Time (Min.) | Meringue Specific Gravity |
|---|---|---|---|---|
| Control | | | 10.0 | 0.173 |
| 1 | 0.006 | | 4.5 | 0.170 |
| 2 | | 0.03 | 5.0 | 0.168 |
| 3 | 0.003 | 0.03 | 1.5 | 0.158 |
| 4 | 0.004 | 0.03 | 1.0 | 0.130 |
| 5 | 0.006 | 0.03 | 1.0 | 0.139 |
| 6 | 0.006 | 0.01 | 1.0 | 0.155 |
| 7 | 0.003 | 0.01 | 1.5 | 0.165 |

*By weight of reconstituted egg whites.

Thus it is apparent that the present invention provides a novel egg white composition and method of making same and a novel method of reducing the whip time of dried egg whites, said invention achieving all of the objects and advantages sought therefor.

This invention is intended to cover all changes and modifications of the examples of the invention herein chosen for purposes of the disclosure which do not constitute departures from the spirit and scope of the invention.

What is claimed is:

1. A method of decreasing the whip time of dried egg whites when reconstituted in water including the step of adding at least about 0.002% by weight of okra gum to the dried egg whites.

2. A method of decreasing the whip time of dried egg whites when reconstituted in water including the step of adding from about 0.002% to about 0.06% okra gum by weight of the reconstituted egg white to the dried egg whites.

3. A method of decreasing the whip time of dried egg whites when reconstituted in water including the step of adding about 0.04% okra gum by weight of the reconstituted egg white to the dried egg whites.

4. A method of improving the whipping characteristics of egg white including the step of including at least about 0.002% by weight okra gum and at least about 0.01% by weight of a second whip time decreasing agent in an egg white composition, said weight percent being based on the weight of reconstituted egg white, said combination of additives synergistically reducing the whip time of the egg white by an amount greater than either of said additives added alone.

5. The method of claim 4 wherein the egg whites are dried egg whites, the okra gum is present in an amount from about 0.01% to about 0.06% by weight based on the weight of reconstituted egg white, and the second whip time decreasing agent is present in an amount of 0.01% for about 0.06% by weight based on the weight of reconstituted egg white.

6. A method as defined in claim 4 wherein said egg white composition is dried egg white.

7. A method as defined in claim 6 wherein said second whip time decreasing agent is triethyl citrate.

8. A method as defined in claim 6 wherein said second whip time decreasing agent is triacetin.

9. A method as defined in claim 6 wherein said second whip time decreasing agent is sodium desoxycholate.

10. A method as defined in claim 6 wherein said second whip time decreasing agent is sodium lauryl sulfate.

11. A method of improving the whipping characteristics of egg whites including the steps of incorporating about 0.04% okra gum and about 0.03% triethyl citrate in a dried egg white containing composition, said additives being by weight based on the weight of reconstituted egg whites.

12. A method of improving the whipping characteristics of egg whites including the step of adding at least 0.002% okra gum to egg whites, said percent being by weight of the egg whites.

13. A method of improving the whipping characteristics of egg whites including the step of adding from about 0.002% by weight to about 0.06% by weight okra gum to egg whites, said weight percent being based on the weight of egg whites.

(References on following page)

References Cited by the Examiner

UNITED STATES PATENTS

| | | | |
|---|---|---|---|
| 2,052,028 | 8/1936 | Harris et al. | 99—113 X |
| 2,183,516 | 12/1939 | Mink | 99—210 |
| 2,637,654 | 5/1953 | Kothe. | |
| 2,767,167 | 10/1956 | Opie et al. | 260—209 |
| 2,834,774 | 5/1958 | Anker | 260—209 |
| 2,850,394 | 9/1958 | Harrel et al. | 99—210 |
| 2,881,077 | 4/1959 | Kline et al. | 99—113 |
| 2,919,992 | 1/1960 | Gorman et al. | 99—210 |
| 2,933,397 | 4/1960 | Maturi et al. | 99—113 |

OTHER REFERENCES

"Commercial Fruit and Vegetable Products," 1938, by W. V. Cruess, pub. by McGraw-Hill Book Co., Inc., New York, page 218, article entitled Okra.

A. LOUIS MONACELL, *Primary Examiner.*

HYMAN LORD, *Examiner.*